United States Patent
Cuddihy et al.

(10) Patent No.: US 9,612,797 B2
(45) Date of Patent: Apr. 4, 2017

(54) METHOD AND APPARATUS FOR A NEAR FIELD COMMUNICATION SYSTEM TO EXCHANGE OCCUPANT INFORMATION

(75) Inventors: Mark A. Cuddihy, New Boston, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1199 days.

(21) Appl. No.: 13/217,591

(22) Filed: Aug. 25, 2011

(65) Prior Publication Data

US 2013/0054051 A1   Feb. 28, 2013

(51) Int. Cl.
| | |
|---|---|
| *G06F 7/00* | (2006.01) |
| *B60R 11/02* | (2006.01) |
| *B60R 16/037* | (2006.01) |
| *H01Q 1/32* | (2006.01) |
| *H04H 20/62* | (2008.01) |

(52) U.S. Cl.
CPC ............... *G06F 7/00* (2013.01); *B60R 11/02* (2013.01); *B60R 16/037* (2013.01); *H01Q 1/32* (2013.01); *H04H 20/62* (2013.01)

(58) Field of Classification Search
CPC ......... B60R 11/02; B60R 16/037; G06F 7/00; H04H 20/62; H01Q 1/32; G07C 5/008
USPC ........................................ 701/2, 36; 342/463
See application file for complete search history.

(56) References Cited

U.S. PATENT DOCUMENTS

| | | |
|---|---|---|
| 6,028,537 A | 2/2000 | Suman et al. |
| 6,278,772 B1 | 8/2001 | Bowater et al. |
| 6,385,535 B2 | 5/2002 | Ohishi |
| 6,411,899 B2 | 6/2002 | Dussell |
| 6,430,488 B1 | 8/2002 | Goldman et al. |
| 6,459,969 B1 | 10/2002 | Bates et al. |
| 6,505,780 B1 | 1/2003 | Yassin et al. |

(Continued)

FOREIGN PATENT DOCUMENTS

| | | |
|---|---|---|
| EP | 1969458 | 9/2008 |
| JP | 2007205872 A | 8/2007 |

(Continued)

OTHER PUBLICATIONS

Christoph Hammerschmidt, Melexis, The Sky's the Limit, Continental NXP to integrate NFC into cars, Feb. 17, 2011, http://automotive-eetimes.com/en/continental-nxp-to-integrate-nfc-into-cars.html?cmp_id=.

(Continued)

*Primary Examiner* — Nga X Nguyen
(74) *Attorney, Agent, or Firm* — Jennifer Stec; Brooks Kushman P.C.

(57) ABSTRACT

A system includes a plurality of antennas, positioned to be capable of receiving a wireless near field communication (NFC) device signal associated with a device located in any one of a driver's back pocket or front pocket, a center console or a passenger seat. The system also includes an NFC reader, in communication with the plurality of antennas. The NFC reader is operable to assign, based at least in part on a number of signals received and a signal strength, one of one or more devices associated with detected signals to a driver. The NFC reader is in communication with a vehicle computing system, operable to retrieve additional information associated with the device assigned to the driver and to apply that information to control vehicle settings.

7 Claims, 4 Drawing Sheets

(56) References Cited

U.S. PATENT DOCUMENTS

| | | |
|---|---|---|
| 6,600,975 B2 | 7/2003 | Moriguchi et al. |
| 6,629,033 B2 | 9/2003 | Preston et al. |
| 6,728,349 B2 | 4/2004 | Chang et al. |
| 6,845,251 B2 | 1/2005 | Everhart et al. |
| 6,928,428 B1 | 8/2005 | De Vries |
| 6,993,490 B2 | 1/2006 | Chen et al. |
| 7,065,533 B2 | 6/2006 | Arrouye et al. |
| 7,120,928 B2 | 10/2006 | Sheth et al. |
| 7,127,259 B2 | 10/2006 | Ueda et al. |
| 7,129,825 B2 | 10/2006 | Weber |
| 7,139,722 B2 | 11/2006 | Perrella et al. |
| 7,142,664 B2 | 11/2006 | Seligmann |
| 7,143,058 B2 | 11/2006 | Sugimoto et al. |
| 7,145,998 B1 | 12/2006 | Holder et al. |
| 7,162,237 B1 | 1/2007 | Silver et al. |
| 7,283,813 B2 | 10/2007 | Hamanaga et al. |
| 7,340,691 B2 | 3/2008 | Bassett et al. |
| 7,346,630 B2 | 3/2008 | Eichstaedt et al. |
| 7,370,079 B2 | 5/2008 | Murata et al. |
| 7,376,226 B2 | 5/2008 | Holder et al. |
| 7,433,714 B2 | 10/2008 | Howard et al. |
| 7,444,384 B2 | 10/2008 | Horvitz |
| 7,469,827 B2 | 12/2008 | Katragadda et al. |
| 7,474,264 B2 * | 1/2009 | Bolduc et al. ............. 342/463 |
| 7,552,009 B2 | 6/2009 | Nelson |
| 7,574,195 B2 | 8/2009 | Krasner et al. |
| 7,586,956 B1 | 9/2009 | Mishra et al. |
| 7,725,480 B2 | 5/2010 | Bassett et al. |
| 7,747,246 B2 | 6/2010 | Zellner et al. |
| 7,801,283 B2 | 9/2010 | Harwood et al. |
| 7,813,950 B2 | 10/2010 | Perrella et al. |
| 7,889,096 B2 | 2/2011 | Breed |
| 7,917,285 B2 | 3/2011 | Rothschild |
| 7,985,911 B2 | 7/2011 | Oppenheimer |
| 8,112,720 B2 | 2/2012 | Curtis |
| 8,126,889 B2 | 2/2012 | Pitt |
| 8,223,975 B2 | 7/2012 | Marko |
| 8,233,890 B2 | 7/2012 | Zellner et al. |
| 8,316,046 B2 | 11/2012 | Huang et al. |
| 2001/0037174 A1 | 11/2001 | Dickerson |
| 2002/0068583 A1 | 6/2002 | Murray |
| 2002/0107032 A1 | 8/2002 | Agness et al. |
| 2002/0143879 A1 | 10/2002 | Sommerer |
| 2003/0131023 A1 | 7/2003 | Bassett et al. |
| 2003/0212480 A1 | 11/2003 | Lutter et al. |
| 2004/0073643 A1 | 4/2004 | Hayes et al. |
| 2004/0090121 A1 | 5/2004 | Simonds et al. |
| 2004/0092253 A1 | 5/2004 | Simonds et al. |
| 2004/0093154 A1 | 5/2004 | Simonds et al. |
| 2004/0093155 A1 | 5/2004 | Simonds et al. |
| 2004/0192270 A1 | 9/2004 | Kreitzer |
| 2004/0220768 A1 | 11/2004 | Klein |
| 2004/0254715 A1 | 12/2004 | Yamada |
| 2004/0268270 A1 | 12/2004 | Hill et al. |
| 2005/0019228 A1 | 1/2005 | Myers et al. |
| 2005/0088284 A1 | 4/2005 | Zai et al. |
| 2005/0119030 A1 | 6/2005 | Bauchot et al. |
| 2005/0149520 A1 | 7/2005 | De Vries |
| 2005/0222933 A1 | 10/2005 | Wesby |
| 2006/0058948 A1 | 3/2006 | Blass et al. |
| 2006/0071804 A1 | 4/2006 | Yoshioka |
| 2006/0165015 A1 | 7/2006 | Melick et al. |
| 2006/0168627 A1 | 7/2006 | Zeinstra et al. |
| 2006/0258377 A1 | 11/2006 | Economos et al. |
| 2006/0290490 A1 | 12/2006 | Kraus et al. |
| 2007/0004387 A1 | 1/2007 | Gadamsetty et al. |
| 2007/0016362 A1 | 1/2007 | Nelson |
| 2007/0042812 A1 | 2/2007 | Basir |
| 2007/0044037 A1 | 2/2007 | Amari et al. |
| 2007/0053513 A1 | 3/2007 | Hoffberg |
| 2007/0061067 A1 | 3/2007 | Zeinstra et al. |
| 2007/0120948 A1 | 5/2007 | Fujioka et al. |
| 2007/0140187 A1 | 6/2007 | Rokusek et al. |
| 2007/0233725 A1 | 10/2007 | Michmerhuizen et al. |
| 2007/0238491 A1 | 10/2007 | He |
| 2007/0264990 A1 | 11/2007 | Droste et al. |
| 2007/0281603 A1 | 12/2007 | Nath et al. |
| 2007/0285256 A1 | 12/2007 | Batra |
| 2007/0294304 A1 | 12/2007 | Bassett et al. |
| 2007/0299882 A1 | 12/2007 | Padgett et al. |
| 2008/0005680 A1 | 1/2008 | Greenlee |
| 2008/0057927 A1 | 3/2008 | Han |
| 2008/0086455 A1 | 4/2008 | Meisels et al. |
| 2008/0140488 A1 | 6/2008 | Oral et al. |
| 2008/0143497 A1 | 6/2008 | Wasson et al. |
| 2008/0150685 A1 | 6/2008 | Desai et al. |
| 2008/0159503 A1 | 7/2008 | Helbling et al. |
| 2008/0263069 A1 | 10/2008 | Harris et al. |
| 2008/0281518 A1 | 11/2008 | Dozier et al. |
| 2008/0294483 A1 | 11/2008 | Williams |
| 2008/0294663 A1 | 11/2008 | Heinley et al. |
| 2008/0319653 A1 | 12/2008 | Moshfeghi |
| 2008/0319665 A1 | 12/2008 | Berkobin et al. |
| 2009/0002145 A1 | 1/2009 | Berry et al. |
| 2009/0005966 A1 | 1/2009 | McGray et al. |
| 2009/0011799 A1 | 1/2009 | Douthitt et al. |
| 2009/0056525 A1 | 3/2009 | Oppenheimber |
| 2009/0074168 A1 | 3/2009 | Henry |
| 2009/0075624 A1 | 3/2009 | Cox et al. |
| 2009/0094088 A1 | 4/2009 | Chen et al. |
| 2009/0111422 A1 | 4/2009 | Bremer et al. |
| 2009/0112608 A1 | 4/2009 | Abu-Hakima et al. |
| 2009/0144622 A1 | 6/2009 | Evans et al. |
| 2009/0157615 A1 | 6/2009 | Ross et al. |
| 2009/0157717 A1 | 6/2009 | Palahnuk et al. |
| 2009/0158200 A1 | 6/2009 | Palahnuk et al. |
| 2009/0193149 A1 | 7/2009 | Khosravy |
| 2009/0248285 A1 | 10/2009 | Bauer |
| 2009/0267757 A1 | 10/2009 | Nguyen |
| 2009/0312901 A1 | 12/2009 | Miller et al. |
| 2010/0017543 A1 | 1/2010 | Preston et al. |
| 2010/0062714 A1 | 3/2010 | Ozaki |
| 2010/0086112 A1 | 4/2010 | Jiang et al. |
| 2010/0125801 A1 | 5/2010 | Shin |
| 2010/0136944 A1 | 6/2010 | Taylor et al. |
| 2010/0148920 A1 | 6/2010 | Philmon et al. |
| 2010/0159964 A1 | 6/2010 | Ferro |
| 2010/0169432 A1 | 7/2010 | Santori, Jr. et al. |
| 2010/0210302 A1 | 8/2010 | Santori et al. |
| 2010/0227629 A1 | 9/2010 | Cook et al. |
| 2010/0228803 A1 | 9/2010 | Quinn |
| 2010/0233957 A1 | 9/2010 | Dobosz |
| 2010/0235891 A1 | 9/2010 | Oglesbee et al. |
| 2010/0274689 A1 | 10/2010 | Hammad et al. |
| 2010/0274865 A1 | 10/2010 | Frazier et al. |
| 2010/0287024 A1 | 11/2010 | Ward et al. |
| 2010/0323657 A1 | 12/2010 | Barnard et al. |
| 2010/0330975 A1 | 12/2010 | Basir |
| 2011/0021234 A1 | 1/2011 | Tibbetts et al. |
| 2011/0039581 A1 | 2/2011 | Cai et al. |
| 2011/0040707 A1 | 2/2011 | Theisen et al. |
| 2011/0045810 A1 | 2/2011 | Issa et al. |
| 2011/0072492 A1 | 3/2011 | Mohler et al. |
| 2011/0087705 A1 | 4/2011 | Swink et al. |
| 2011/0121991 A1 | 5/2011 | Basir |
| 2011/0137520 A1 * | 6/2011 | Rector et al. ............. 701/36 |
| 2011/0137773 A1 | 6/2011 | Davis et al. |
| 2011/0144980 A1 | 6/2011 | Rysenga |
| 2011/0176670 A1 | 7/2011 | Kaplan et al. |
| 2011/0257881 A1 | 10/2011 | Chen et al. |
| 2011/0289522 A1 | 11/2011 | Pontual et al. |
| 2011/0298924 A1 | 12/2011 | Miller et al. |
| 2011/0300843 A1 | 12/2011 | Miller et al. |
| 2011/0300884 A1 | 12/2011 | Ollila et al. |
| 2012/0010805 A1 | 1/2012 | Wilkerson |
| 2012/0041633 A1 | 2/2012 | Schunder et al. |
| 2012/0044089 A1 | 2/2012 | Yarnold et al. |
| 2012/0050028 A1 | 3/2012 | Mastronardi et al. |
| 2012/0130953 A1 | 5/2012 | Hind et al. |
| 2012/0149441 A1 | 6/2012 | Saito et al. |
| 2012/0158658 A1 | 6/2012 | Wilkerson |
| 2012/0158918 A1 | 6/2012 | Leblanc et al. |
| 2012/0172009 A1 | 7/2012 | Wilkerson |
| 2012/0202525 A1 | 8/2012 | Pettini |

(56) References Cited

U.S. PATENT DOCUMENTS

2012/0225677 A1 9/2012 Forstall et al.
2012/0271676 A1 10/2012 Aravamudan et al.
2012/0272176 A1 10/2012 Nielsen et al.
2013/0024109 A1 1/2013 Hosotani et al.
2013/0124085 A1 5/2013 Mochizuki et al.

FOREIGN PATENT DOCUMENTS

| JP | 2008172820 A | 7/2008 |
|---|---|---|
| WO | 03107129 A2 | 12/2003 |
| WO | 2011016886 A1 | 2/2011 |

OTHER PUBLICATIONS

AppManiax, Inc. "PhonePlus Callback". http://www.handango.com/catalog/ProductDetails.jsp?productId=254405&platformId=80.
JNetX Call Reminder for BlackBerry. Feb. 17, 2009. Retrieved from: http://www.pocketberry.com/2009/02/17/jnetx-call-reminder-for-blackberry/.
Blackberry, Blackberry Curve Series Blackberry Curve 9300/9330 Smartphones, User Guide Version 6.0, www.blackberry.com/docs/smartphones.
Ford Motor Company, "SYNC with Navigation System," Owner's Guide Supplement, SYNC System Version 1 (Jul. 2007).
Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem", Automotive Design & Production, Oct. 2003, http://findarticles.com, pp. 1-3.
Search Report for German Applications 102011089349.0 (FMC 3324 PUS corresponding DE appln) dated Jan. 8, 2013, 7 pgs.

* cited by examiner

METHOD AND APPARATUS FOR A NEAR FIELD COMMUNICATION SYSTEM TO EXCHANGE OCCUPANT INFORMATION

TECHNICAL FIELD

The illustrative embodiments generally relate to a method and apparatus for a near field communication system to exchange occupant information.

BACKGROUND

Vehicle computing and infotainment systems grow more advanced every year. Long evolved from simple radios, newer systems can provide a driver with the ability to control navigation, stream music, set temperatures for various zones in the car, check vehicle statistics, set driving preferences, set vehicle systems, and a host of other options.

For example, a driver, using either a vehicle computing system or various vehicle features all communicable with a vehicle network, can adjust mirrors, seats, pedals, the steering wheel, etc. Of course, while these settings are appropriate for that driver, another driver may require different adjustments.

In a similar manner, drivers can preset radio settings, set preferred streaming music settings, set navigation preferences (for example, without limitation, fastest route vs. fuel efficient route), etc. Again, as with the physical system settings, these various settings may be adjusted based on who is driving a vehicle.

In one implementation, a driver can establish a profile in a vehicle computing system, and the system can store information relating to the driver. Of course, depending on how detailed settings are, this could result in some personal information being stored in a vehicle (which could then be accessed by a third party who hacks the system). For example, if a vehicle had a passenger medical information setting, which could, in the event of an accident, provide paramedics with relevant information relating to vehicle passengers, drivers may wish to use this setting, but be reticent about having their medical information permanently stored in a vehicle system.

As an alternative, this information may be stored on a wireless device, such as, but not limited to, a cellular phone, and transferred to a vehicle when the device enters the vehicle. One possible implementation for such a transfer is through BlueTooth communication. Such wireless transfer systems, however, must typically be paired with a particular system, meaning that a driver who enters a vehicle having an unpaired device, cannot benefit from an automatic transfer of information.

SUMMARY

In a first illustrative embodiment, a system includes a plurality of antennas, positioned to be capable of receiving a wireless near field communication (NFC) device signal associated with a device located in any one of a driver's back pocket or front pocket, a center console or a passenger seat. The illustrative system also includes an NFC reader, in communication with the plurality of antennas.

The NFC reader is operable to assign, based at least in part on a number of signals received and a signal strength, one of one or more devices associated with detected signals to a driver. The NFC reader is in communication with a vehicle computing system, operable to retrieve additional information associated with the device assigned to the driver and to apply that information to control vehicle settings.

In a second illustrative embodiment, a computer implemented method includes detecting one or more near field communication (NFC) IDs, each corresponding to a wireless device. The method further includes ranking the IDs by a number of antennas detecting each ID and an associated signal strength, respectively, contingent on detecting a plurality of IDs. The method additionally includes determining a single ID detected by the most antennas and, contingent on a single ID being detected by the most antennas, associating the wireless device with which the ID corresponds with a driver.

The method also includes, contingent on a single ID not being detected by the most antennas, determining if a single ID has a greatest signal strength associated therewith. Further, the method includes, contingent on a single ID having a greatest signal strength associated therewith, associating the wireless device with which the ID corresponds with a driver. Additionally, the method includes applying, via a vehicle computing system, a plurality of vehicle system settings correlating to a wireless device associated with the driver, wherein, if a wireless device has not been associated with the driver, a standard set of vehicle system settings are applied.

In a third illustrative example, a computer readable storage medium, stores instructions that, when executed by a processor, cause the processor to perform the method including detecting one or more near field communication (NFC) IDs, each corresponding to a wireless device. The method also includes, contingent on detecting a plurality of IDs, ranking the IDs by a number of antennas detecting each ID and an associated signal strength, respectively. The method further includes determining a single ID detected by the most antennas.

Also, the method includes associating the wireless device with which the ID corresponds with a driver, contingent on a single ID being detected by the most antennas. Further, the method includes determining if a single ID has a greatest signal strength associated therewith, contingent on a single ID not being detected by the most antennas. Additionally, the method includes associating the wireless device with which the ID corresponds with a driver, contingent on a single ID having a greatest signal strength associated therewith. The method also includes applying a plurality of vehicle system settings correlating to a wireless device associated with the driver, wherein, if a wireless device has not been associated with the driver, a standard set of vehicle system settings are applied.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
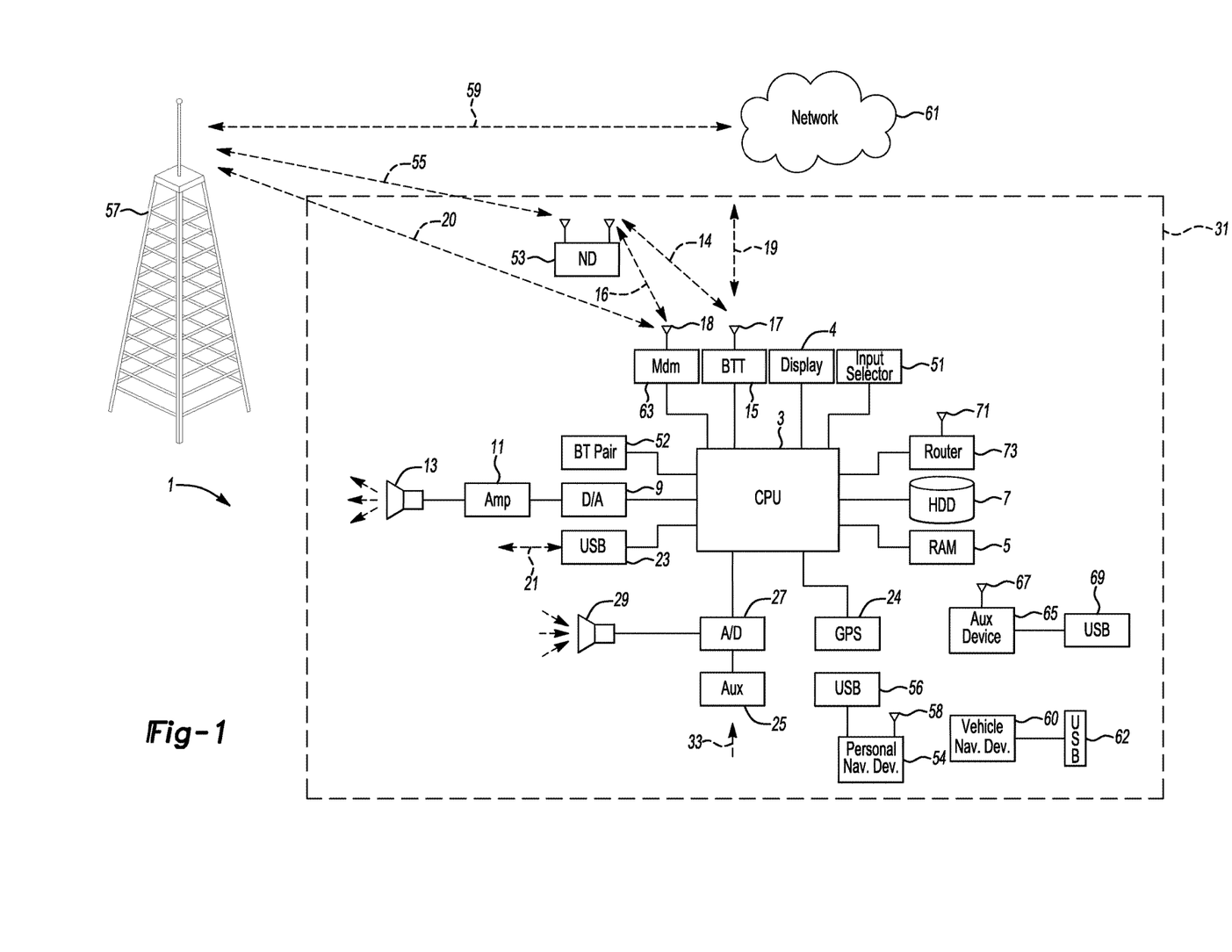
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

A system for automatic driver information transfer, using near field communication technology, is proposed. This communication system is based on, for example, RFID or other near field communication technology. Some non-limiting examples of standards covered by this invention include, but are not limited to, ISO/IEC 18092, ISO/IEC 14443 and JIS X 6319-4.

Devices incorporating at least one of the described standards may conform to the Digital Protocol Technical Specification, which defines bit-level coding, bit rates, frame formats, protocols and command sets for two-way communication to facilitate data transfer between devices incorporating these standards (other standards may also conform to such a protocol or similar protocols).

Communication between a device containing a near field communication system may be initiated by proximity to transceiver or transceivers included with a vehicle, and identification information may be automatically sent when a driver enters a vehicle.

In addition to sending an identification number, personal information relating to a driver and relevant to one or more vehicle systems or settings may also be stored on the wireless device and transferred to the vehicle, or stored in the vehicle and associated with a transferred identification.

Since many system settings relate to driver preferences (mirror, seat, steering wheel, etc.), it may also be useful to be able to distinguish between a driver and a passenger in a vehicle system. Further, devices may not always be on a driver's person (they could be in a purse or be set on a passenger seat or in a center storage container). Since the location of the device is not always known, it would be ideal to provide a sensor array that allows detection of a device regardless of its location (or one that covers almost all cases) and further provides distinction between a driver and passenger device.

Figure 2:
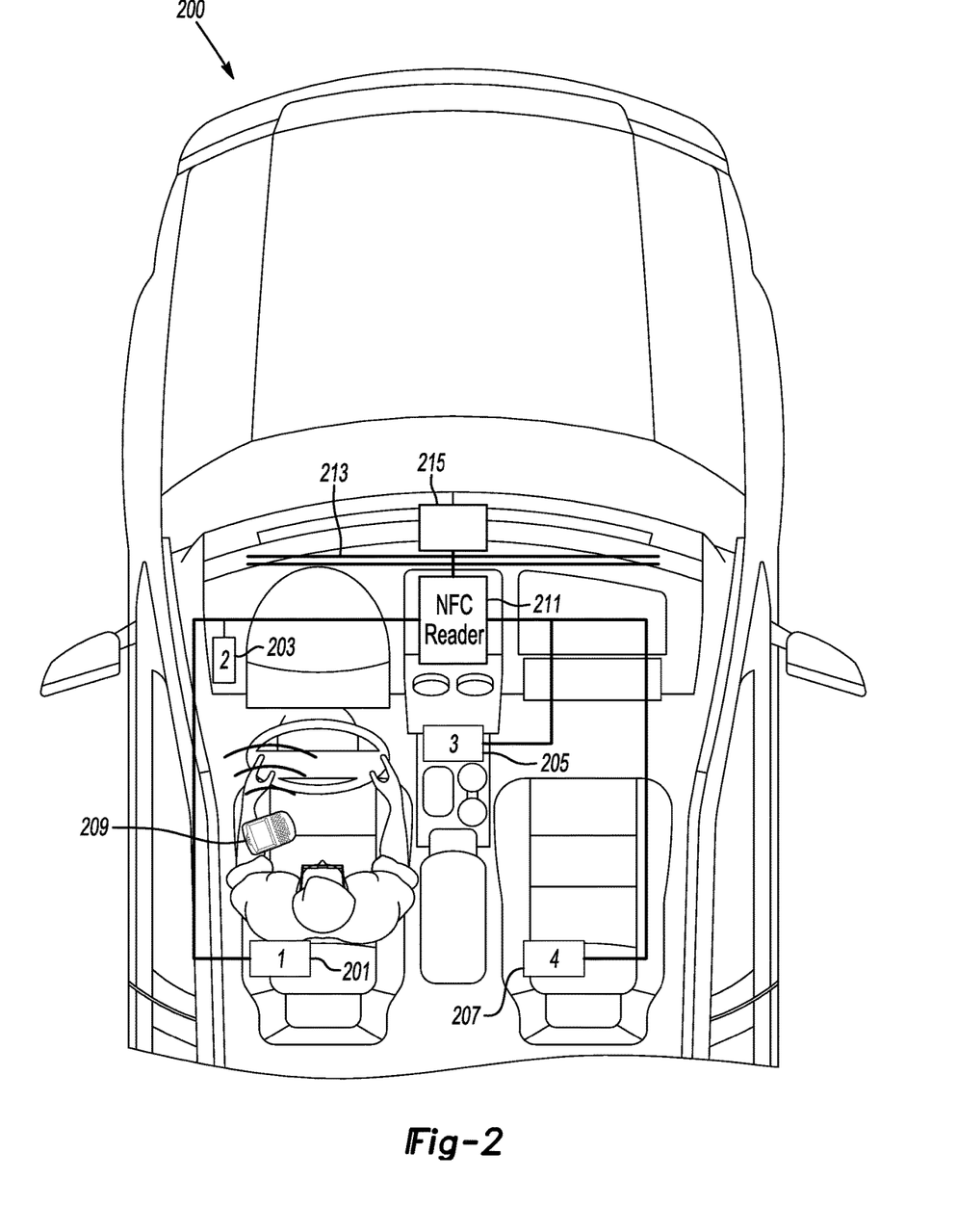
FIG. 2 shows an illustrative vehicle sensor system.

FIG. 2 shows an illustrative vehicle sensor system 200. In this illustrative example, four antennas, sensors or transceivers are deployed in a vehicle to provide detection of and identification of a driver device equipped with NFC capability.

Sensors 1 201 and 2 203 are provided in a forward and rearward location relative to a seated driver. Some NFC technology is not detectable through a driver's person, so it may be desirable to provide a sensor both forward and rearward of a seated driver. In this manner, a phone carried in a front pocket, set in a lap, in a back pocket or in a side pocket can be detectable.

Since the communication range may be rather limited for security reasons, a third sensor 205 may be provided in a center stack to detect a device placed within the center console. Also, because drivers may have a phone in a purse and set the purse on a passenger seat, or because drivers may simply set their phone on the seat, a fourth sensor 207 may be provided in a passenger seat (or dashboard, on the passenger side) to detect phones in the passenger seat.

Additional sensor locations include, but are not limited to, a second sensor in the center console, one or more sensors in the doors on either side, and one or two sensors for one or more of the rear seats for use with detecting information of passengers.

Each of the antennas/sensors is connected to an NFC reader 211 capable of reading information relayed from a device 209 equipped with NFC technology. The information read can be transferred to a vehicle network 213 and relayed from there to connected modules, including, but not limited to, a restraint control module 215.

Figure 3:
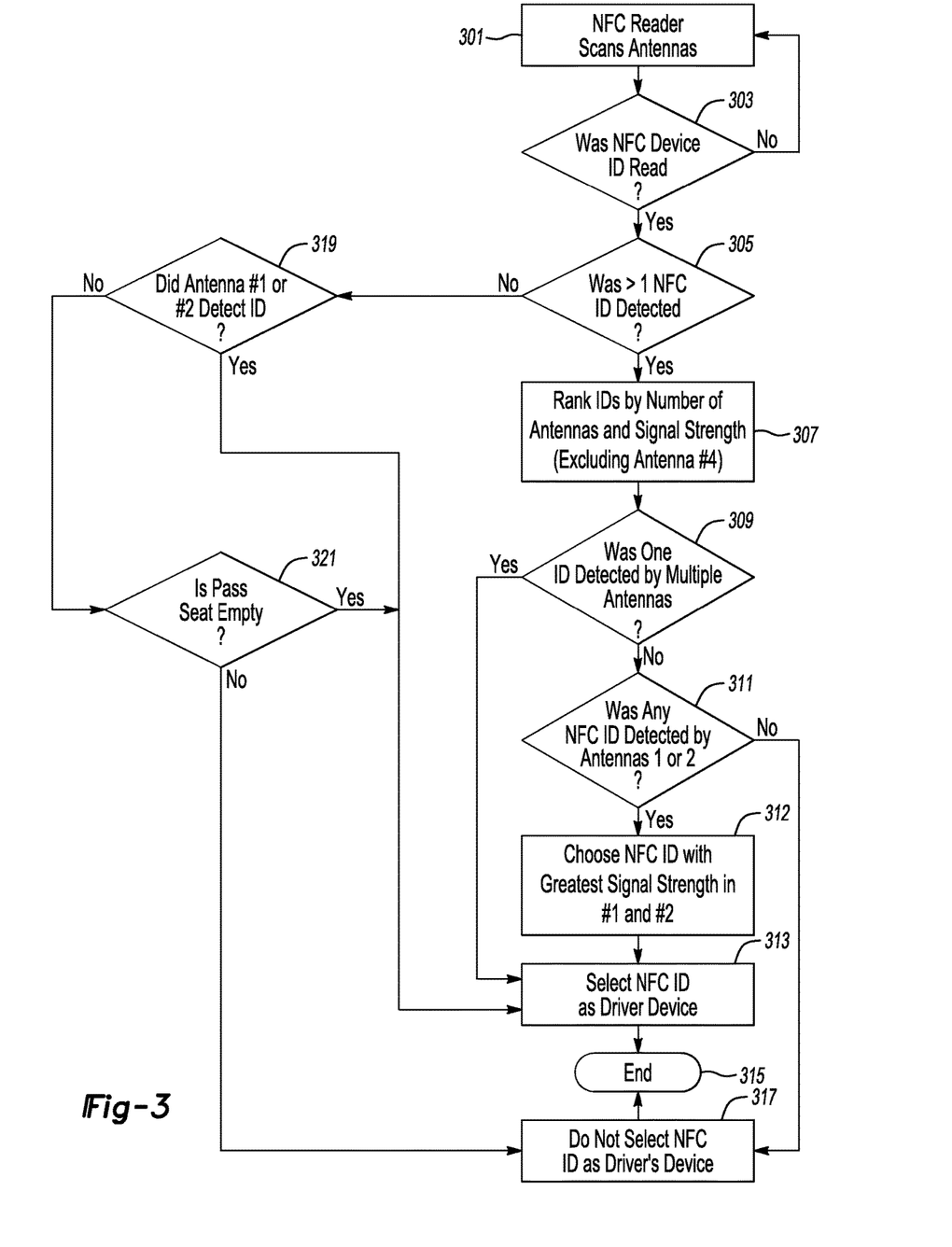
FIG. 3 shows an illustrative detection process.

In addition to being able to sense wireless NFC devices in multiple locations, the proposed antenna array can also determine which device (if multiple devices are present) belongs to a driver (or other occupant). NFC receivers can determine signal strength, as well as merely detect signals, and FIG. 3 shows an illustrative detection process. This process could be modified, as will be appreciated, to include similar processes for determining particular devices in particular locations, depending on the layout of an array.

In the illustrative example shown in FIG. 3, the NFC reader scans each of the NFC antennas in the array 301 (in this example, four antennas). If an NFC device ID is not read at any point 303, the scanning simply continues. Scanning can be initiated, for example, upon vehicle start up, infotainment system enablement, or at any other suitable time. In one example, a vehicle may be left running, and if the vehicle detects that a driver has exited and entered a vehicle (through seat sensors, door sensors, etc.) a new scan may be initiated (in case drivers changed).

If an NFC device is detected at any point, the process determines if more than one NFC ID is detected 305. If only one ID was detected 305, the process determines if antenna 1 or antenna 2 (the "driver" antennas in this embodiment) detected the ID 319. If either of these sensors did not detect the device (meaning it was sensor 3 or 4 that did the detection), the system determines if the passenger seat is also empty 321. Generally, this combination of detections should serve to determine if a passenger is carrying the device (and thus driver settings on the device may not be appropriate). There are, of course, exceptions not covered by this exemplary process, but one of skill should understand how to modify the process to cover discovered exceptions while remaining within the scope of the invention.

If the single detection point was a driver antenna 319, the process uses the NFC device detected as a driver device 313 and exits 315. Similarly, if the single detection point was not a driver antenna, and the passenger seat is empty, the device is assumed to belong to the driver. If, however, the passenger seat is occupied, the process will not use the device, and may instead apply "base" settings for vehicle systems, or at least for systems relating to a driver.

If multiple signals are detected (possibly indicating the presence of more than one device, the process ranks detected IDs by the number of antennas detecting the IDs and signal strength of each 307. In this example, the passenger antenna is excluded.

If one of the IDs was detected by multiple antennas 309 (excluding the passenger antenna, in this example) then that ID is considered to correspond to the driver's device 313. If each ID was only detected by one antenna, the process determines if any of the IDs were detected by at least one of antennas 1 or 2 311. If there was at least one ID meeting this criteria, the ID with the greatest strength in antennas 1 and 2 is selected 312, otherwise, no ID is selected as corresponding to a driver device.

Additionally, the device IDs could be presented so that confirmation can be had that a particular selected or skipped signal does or does not correspond to a driver. Further modification can also be made to this process if desired, such that signals received at, for example, sensor two (forward of the driver) have priority over stronger signals received at sensor three in the center column (which may address a case where a driver device is more distant from a forward sensor than a passenger device is from a center column sensor. Other suitable changes are also contemplated to be within the scope of the invention.

In at least one embodiment, once a wireless device ID has been associated with a driver, a vehicle computing system can initiate BLUETOOTH data link, without having to first "pair" the wireless device with the vehicle system. Additionally or alternatively, multiple devices can be detected, associated with occupants using an appropriate array. The devices can then have data relating thereto enabled, transferred or retrieved by the vehicle computing system.

Figure 4:
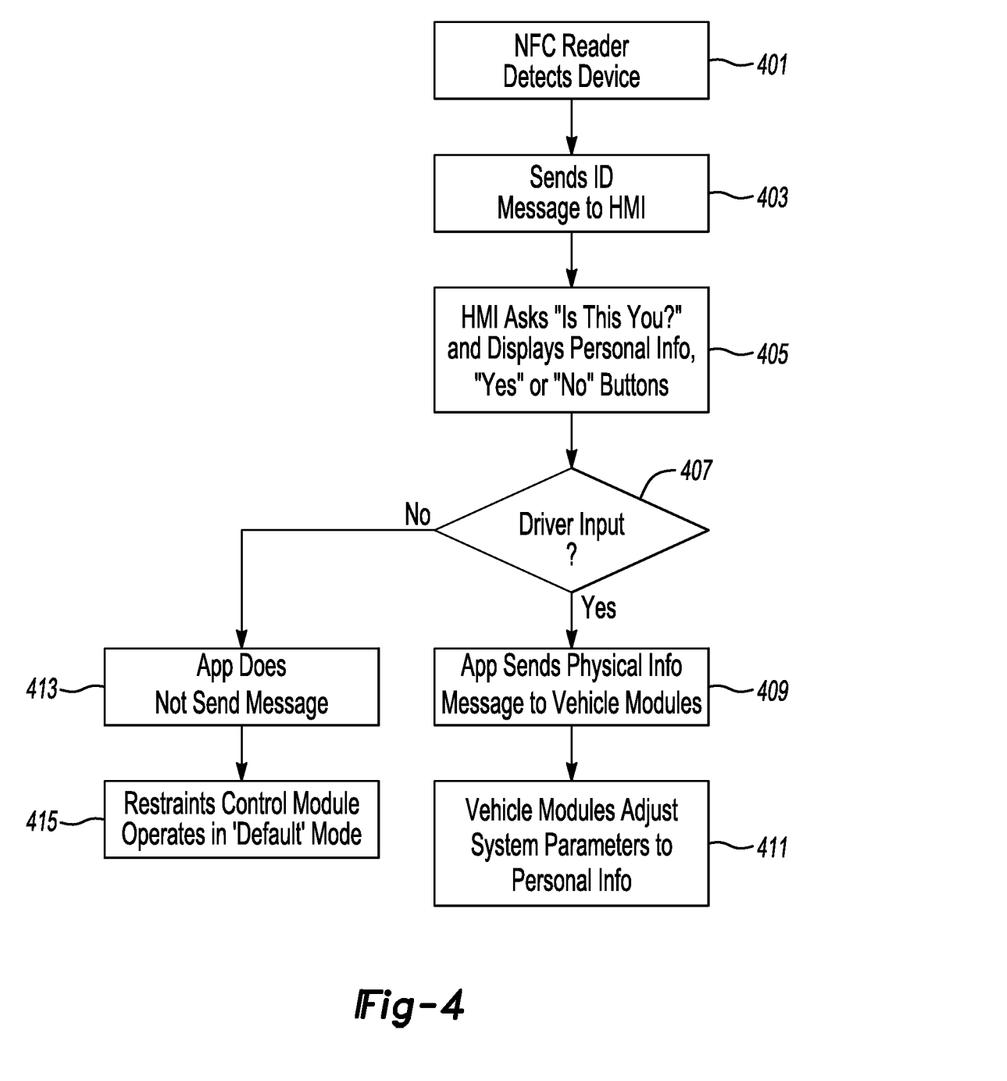
FIG. 4 shows an illustrative data transfer process.

FIG. 4 shows an illustrative data transfer confirmation process. In this illustrative example, an NFC reader detects a particular device and associates that device with the driver 401. A vehicle computing system then receives information relating to that device and enables a human machine interface (HMI) 403.

Through the HMI, the system queries the driver as to whether the correct phone has been selected 405. Additionally or alternatively, if multiple devices are present and a determination of a driver device cannot be made, the system may list multiple options and as the driver to select a device.

In this example, if the driver inputs a "yes" (indicating that the device selection was correct) 407, the process sends information to one or more vehicle modules, relating to driver preferences 409. The modules then adjust their respective vehicle systems to match the sent information 411.

Alternatively, if the driver inputs a "no" 407, the process does not send a message 413 and the various modules operate in a default mode 415.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    at least three antennas, positioned to be capable of receiving a wireless near field communication (NFC) device signal associated with a device located in any one of a driver's back pocket or front pocket, a center console or a passenger seat, wherein antennas are deployed, individually, in at least a driver side door, a passenger side door, and in a center console;
    an NFC reader, in communication with the plurality of antennas, wherein the NFC reader is operable to assign, based at least in part on a number of signals received and a signal strength, one of one or more devices associated with detected signals to a driver, wherein
    the NFC reader is in communication with a vehicle computing system, operable to retrieve additional information associated with the device assigned to the driver and to apply that information to control vehicle settings.

2. The system of claim 1, wherein the at least three antennas includes four antennas.

3. The system of claim 2, wherein the four antennas are deployed, individually, forward of a driver in the driver side door, rearward of a driver, in a center console and relative to a passenger seat in the passenger side door, further from the driver than a center console antenna.

4. The system of claim 1, wherein, if a plurality of signals are detected, the NFC reader further evaluates whether any one signal was received by multiple antennas, wherein, if no signal was received by multiple antennas and at least one driver side antenna received at least one signal, the device associated with the signal received by the at least one driver side antenna is assigned to the driver, wherein, if no signal was received by multiple antennas and no one driver side antenna received at least one signal, no device is assigned to the driver.

5. The system of claim 1, wherein, if a single signal is only received by either one or both of the center console and passenger side antenna, and the passenger seat is occupied, as determined by the vehicle computing system, the NFC reader does not assign a device to the driver.

6. The system of claim 1, wherein, if a plurality of signals are received, the NFC determines that a signal detected by more than one antenna corresponds to the driver.

7. The system of claim 1, wherein, if a plurality of signals are detected by any number of the antennas forward of the driver, rearward of the driver and in the center console, the NFC assigns a device associated with a signal being detected by multiple antennas to the driver.

* * * * *